Lester F. Reifeiss,
James A. Reynolds,
    Inventors.
Koenig, Senniger, Powers and Leavitt,
    Attorneys.

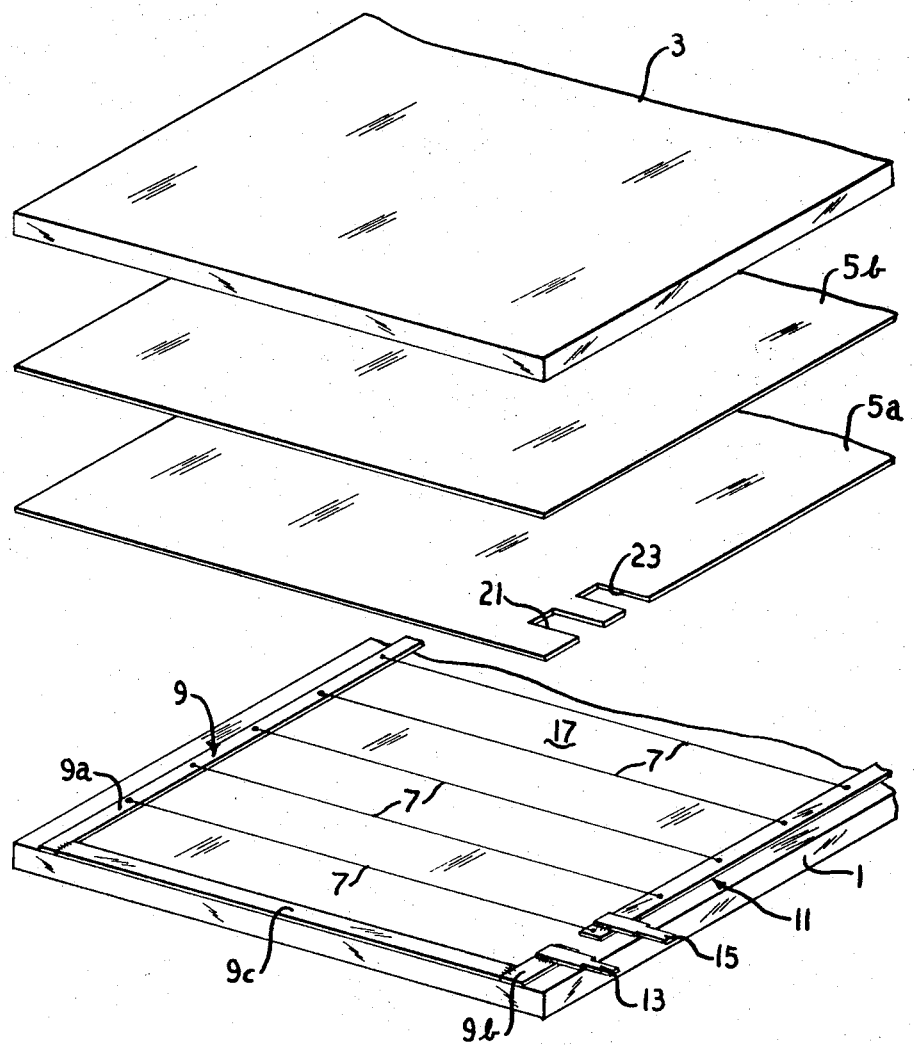

United States Patent Office 3,414,713
Patented Dec. 3, 1968

3,414,713
ELECTRICALLY HEATED GLASS CLOSURE
Lester F. Reifeiss and James A. Reynolds, Conway, Ark., assignors to UMC Industries, Inc., St. Louis, Mo., a corporation of Delaware
Filed Sept. 23, 1966, Ser. No. 581,505
2 Claims. (Cl. 219—522)

ABSTRACT OF THE DISCLOSURE

An electrically heated glass lid for refrigerated merchandising cabinets has a plurality of electrically conductive heating wires extending across the lid between opposed panes of glass, the wires being attached to bus bars constituted by strips of metal foil extending along the side margins of the glass, the strips having an adhesive on one side thereof. Adjacent terminals are attached to the strips, and project beyond the edges of the panes. The panes are bonded together by a laminate of plastic sheet material.

---

This invention relates to electrically heated glass closures and, more particularly, to a glass lid for refrigerated merchandising cabinets having electrical heating means incorporated therein for purposes of preventing condensation of moisture thereon and resutlant loss of visibility through the lid.

Among the several objects of the invention may be noted the provision of an improved closure of the class described which is of safety glass construction, which has the electrical heating means sandwiched between panes of glass of the safety glass construction for electrical safety, and which is of economical construction; the provision of a lid such as described having terminals for making electrical connections for supplying electric power to the heating means at one edge of the lid when the lid is installed in a cabinet, this edge usually being the rear edge of the lid; and the provision of a method of economically manufacturing such closures avoiding cracking of the glass at the terminals. Other objects and features will be in part apparent and in part pointed out hereinafter.

The invention accordingly comprises the constructions and methods hereinafter described, the scope of the invention being indicated in the following claims.

In the accompanying drawings, in which one of various possible embodiments of the invetnion is illustrated, FIG. 1 is a plan of a glass lid of this invention, partly broken away;

FIG. 2 is an exploded fragmentary view; and

Corresponding reference characters indicate corresponding parts throughout the several views of the drawings.

Figure 1:
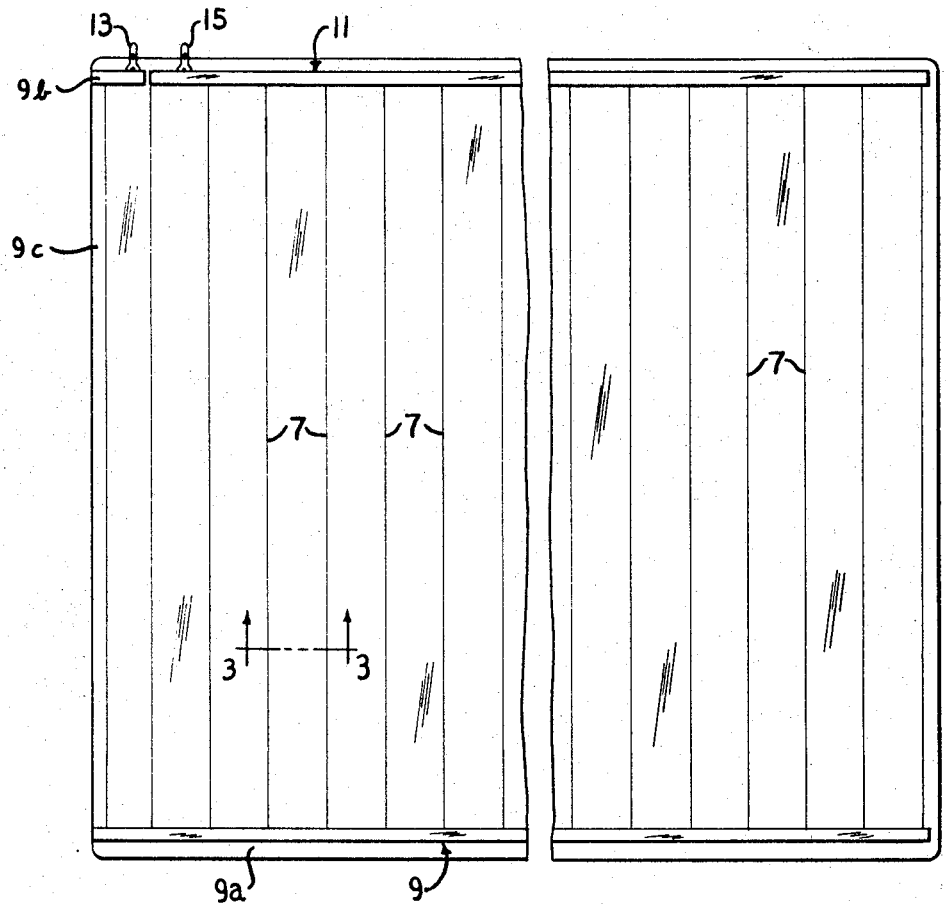
Figure 3:
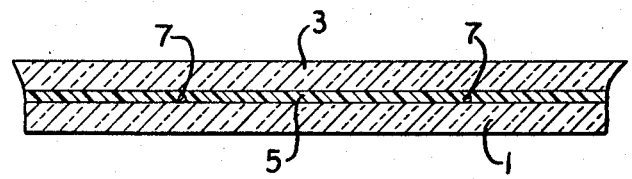
FIG. 3 is an enlarged section taken on line 3—3 of FIG. 1.

Referring to the drawings, a lid of this invention is shown to be generally rectangular in shape, comprising two superimposed rectangular panes of glass 1 and 3 which are bonded together by a transparent plastic laminate 5 between the plates. A plurality of electrically conductive heating wires 7 extend transversely across the lid sandwiched between panes 1 and 3 with opposite ends of the wires attached to bus bars 9 and 11 extending along side margins of the inside face of the pane 1. Terminal strips 13 and 15 are bonded to the bus bars 9 and 11, respectively. Electric current is supplied to the bus bars and to wires 7 by conductors (not shown) attached to the terminal strips.

In manufacturing a lid of this invention, the glass pane 1 is placed on a suitable supporting surface with its face 17 which constitutes the inside face of this pane in the completed lid facing upwardly. Bus bars 9 and 11 are then bonded to the face 17 of pane 1. Preferably, the bus bars 9 and 11 are formed from strips of thin electrically conductive metal foil, such as copper foil, having a pressure-sensitive adhesive on one surface thereof. The adhesive surface of the foil is normally covered by a backing sheet which is stripped off prior to adhering the conductive foil to the glass pane. But bar 11 consists of a single strip of the conductive foil which extends along one side margin of the inside face 17 of pane 1 from one end of the pane to a position near the other end of the pane. The bus bar 9 consists of three strips 9a, 9b and 9c of the electrically conductive foil. The strip 9a is bonded to face 17 of pane 1 along the side margin thereof opposite from the strip 11, preferably extending the entire length of the pane. Strip 9b is positioned along the same side margin of the pane as a strip 11 in end-to-end relation therewith and with the adjacent ends of these strips are spaced apart a slight distance so that they are not in conductive relation. The strip 9c extends along an end margin of the plate 1 on surface 17 between strips 9a and 9b, its ends being soldered or otherwise joined to the ends of the strips 9a and 9b.

Terminals 13 and 15 are soldered to adjacent end portions of the strips 9b and 11, respectively. A portion of each terminal projects beyond the side edge of pane 1 so that a lead wire can be attached thereto after installation of the lid in a cabinet. The electrically conductive heating wires 7 are stretched across the surface 17 and the ends of the wires are soldered to bus bar 11 and section 9a of bus bar 9. The wires are preferably generally parallel to each other and equally spaced apart so that heating of the lid is substantially uniform throughout the length of the lid.

Then, a sheet 5a of plastic film laminate material is laid over the surface 17 of pane 1, the bus bars 9 and 11, and wires 7. Sheet 5a has two notches 21 and 23 opening to one side edge of the sheet. Terminals 13 and 15 are received in the notches to prevent excessive thickness of material at the terminals, thereby to avoid cracking of the glass at the terminals in ensuing steps of the manufacture. Except for notches 21 and 23 the sheet 5a is substantially the same length and width as pane 1.

Then another plastic film sheet 5b is placed over the sheet 5a. Sheet 5b is rectangular and is substantially the same size as pane 1. Sheet 5b is not notched. Pane 3 is positioned over the sheet 5b and, with the parts held in assembled relation, the entire lid is heated and passed between pressure rollers. Then the assembly is placed in an autoclave to complete bonding of the layers together. The resulting laminated safety glass comprises the glass panes 1 and 3 bonded together by the plastic laminate layer 5 resulting from heating of sheets 5a and 5b. The wires 7 and bus bars 9 and 11 are sandwiched between the panes. Terminals 13 and 15 project beyond the rear edges of the glass panes 1 and 3 so that wires can conveniently be attached to them for supplying current to the heating wires 7.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:
1. An electrically heated glass closure, said closure being rectangular and comprising two superimposed rectangular panes of glass, a first strip of metal foil bonded to the inside face of one of said panes by an adhesive on one side of the foil and extending along one side margin thereof, second and third strips of metal foil bonded to the inside face of said one pane by an adhesive on one side of the foil and extending along a second side margin thereof opposite from the first side margin, the second and third strips being positioned in end-to-end aligned relation with adjacent ends of the strips being in spaced relation, a fourth strip of metal foil bonded to the inside face of said one pane by an adhesive on one side of the foil and connecting the first and second strips, a plurality of electrically conductive heating wires extending across the closure between said panes with opposite ends of said wires attached to said first and third strips, said strips comprising bus bars for providing electric current to said heating wires, a pair of terminals, one of the terminals being connected to said second strip and the other terminal being connected to said third strip, both of said terminals extending beyond said second side margin of the closure, and a transparent plastic laminate between said panes bonding them together.

2. An electrically heated glass closure as set forth in claim 1 wherein the terminals are connected to and extend outward from the adjacent end portions of the second and third strips.

References Cited

UNITED STATES PATENTS

| | | | |
|---|---|---|---|
| 2,526,327 | 10/1950 | Carlson | 219—203 X |
| 2,609,474 | 9/1952 | Tidd | 219—213 X |
| 2,625,640 | 1/1953 | Gaiser et al. | 219—522 |
| 2,813,960 | 11/1957 | Egle et al. | 219—345 |
| 2,878,357 | 3/1959 | Thomson et al. | 338—292 |
| 2,982,934 | 5/1961 | Browne | 338—323 |
| 3,223,829 | 12/1965 | Davy et al. | 219—522 |
| 3,287,684 | 11/1966 | Armbruster | 338—211 |
| 3,356,833 | 12/1967 | Orcutt | 219—522 |

BERNARD A. GILHEANY, *Primary Examiner.*

VOLODYMYR Y. MAYEWSKY, *Assistant Examiner.*